(12) United States Patent
Mas et al.

(10) Patent No.: US 7,429,620 B2
(45) Date of Patent: Sep. 30, 2008

(54) SURFACTANT PACKAGE FOR WELL TREATMENT AND METHOD USING SAME

(75) Inventors: Manuel Mas, Caracas (VE); Alicia Colina, Eds Miranda (VE); Williams Aular, Pto LaCroz (VE)

(73) Assignee: Inteveo, S.A. (VE)

( * ) Notice: Subject to any disclaimer, the term of this patent is extended or adjusted under 35 U.S.C. 154(b) by 446 days.

(21) Appl. No.: 10/916,045

(22) Filed: Aug. 10, 2004

(65) Prior Publication Data

US 2006/0035789 A1    Feb. 16, 2006

(51) Int. Cl.
*C09K 8/42* (2006.01)

(52) U.S. Cl. .............. 516/53; 516/57; 516/58; 516/76; 507/240; 507/247; 507/253; 507/254

(58) Field of Classification Search .............. None
See application file for complete search history.

(56) References Cited

U.S. PATENT DOCUMENTS 4,518,512 A * 5/1985 Kanamori .................. 508/389
5,370,185 A * 12/1994 Cowan et al. ............... 166/293

\* cited by examiner

*Primary Examiner*—Marc S Zimmer
(74) *Attorney, Agent, or Firm*—Bachman & LaPointe, P.C.

(57) ABSTRACT

A surfactant blend for servicing wells includes a first non-ionic surfactant having a hydrophilic-lipophilic balance of between about 10 and about 15; a second non-ionic surfactant having a hydrophilic-lipophilic balance of between about 2 and about 6; and an anionic surfactant.

13 Claims, 5 Drawing Sheets

SURFACTANT PACKAGE FOR WELL TREATMENT AND METHOD USING SAME

BACKGROUND OF THE INVENTION

The invention relates to well servicing fluids and, more particularly, to a surfactant blend which is useful in removing oil-based mud cakes and in protecting cement slurries from oil contamination.

During the well drilling process, drilling fluids are used to create a mud cake upon the well walls of the formation being drilled through, so as to control fluid loss. The drilling fluid also serves to help in the removal of cuttings or rubble from the well through circulation to the top of the hole, and maintains stability of the hole, in addition to fluid loss control as mentioned above.

The mud cake which is left upon the walls of the hole can present a problem, however, during subsequent cementing of the well. The mud cake can affect the adherence of cement upon the well walls, particularly if the mud cake is wetted with oil, or formed from an oil-based drilling fluid.

Drilling can be carried out using a water-based fluid. Under these circumstances, removal of the mud cake is relatively easy, and subsequent slurry contamination is not a major issue. However, under certain circumstances drilling is preferred to be carried out using an oil-based drilling fluid. Under these circumstances, cementing problems can increase.

The presence of a mud cake which is wettable with oil, or formed from an oil-based drilling fluid, can completely prevent adherence of cement to the walls of the well due to incompatibility existing between the cement and organic contamination. This can lead to bad cementation and expensive cement repair, particularly if the oil-based fluid contamination occurs near a zone of interest such as an oil producing formation or the like.

One way to remove such a mud cake involves the use of organic solvents, particularly aromatic solvents, which react with the oil-wettable mud cake and dissolve same. Unfortunately, the substitution of gasoil for friendly oils to the environment, the use of additives which can change the wettability in the mud solids, and therefore on the well walls, and the formation of a highly efficient mud cake through drilling fluid additives such as polymers make organic aromatic compound-based chemical washing fluids problematic. This can lead to the use of high volumes of such chemical washes, and/or the need for spacers between treatments in order to obtain sufficient removal of the mud cake.

In addition, the use of oil-based chemical wash components can further require use of a water-based fluid as a spacer between the chemical wash and the subsequent cement slurry so as to avoid contaminating the slurry with organic phase from the wash. This, of course, also leads to increased cementation costs.

Based upon the foregoing, it is clear that the use of oil-based drilling fluid can lead to substantially higher cost compared to other types of drilling fluid due to increased need for chemical wash and spacer materials, and further due to operating time spent to obtain an adequate cement slurry formation. Of course, if problems occur during the first cementing operation, costs can be multiplied due to subsequent attempts at cementating the well.

Based upon the foregoing, it is clear that the need exists for an improved approach toward solving problems caused by mud cake formed from oil-based drilling fluid, and for solving other problems caused by same.

It is therefore, the primary object of the present invention to provide a well servicing fluid in the form of a surfactant blend which readily resolves the aforesaid issues.

It is a further object of the present invention to provide a method for treating a well having oil-based drilling fluid mud cake disposed thereon.

It is a still further object of the present invention to provide a method for cementing a well wherein the cement slurry is protected from contamination.

It is another object of the present invention to provide a method for forming a surfactant blend.

Other objects and advantages of the present invention will appear hereinbelow.

SUMMARY OF THE INVENTION

In accordance with the present invention, the foregoing objects and advantages have been readily attained.

According to the invention, a surfactant blend for servicing wells is provided, which surfactant blend comprises a first non-ionic surfactant having a hydrophilic-lipophilic balance of between about 10 and about 15; a second non-ionic surfactant having a hydrophilic-lipophilic balance of between about 2 and about 6; and an anionic surfactant.

In further accordance with the present invention, a method is provided for making a surfactant blend for servicing wells, which method comprises the steps of providing a base fluid; mixing a first non-ionic surfactant having an HLB of between about 10 and about 15 into the base fluid to provide a first mixture; mixing an anionic surfactant into the first mixture to provide a second mixture; and mixing a second non-ionic surfactant having an HLB of between about 2 and about 6 into the second mixture to form the surfactant blend.

In further accordance with the present invention, a method is provided for removing an oil based fluid mud cake from a well wall, comprising the steps of providing a well defined by a well wall and having an oil based mud cake on the wall; and exposing the mud cake to a surfactant blend comprising a first non-ionic surfactant having a hydrophilic-lipophilic balance of between about 10 and about 15, a second non-ionic surfactant having a hydrophilic-lipophilic balance of between about 2 and about 6, and an anionic surfactant, whereby the surfactant blend changes wettability of solids in the mud cake and forms an emulsion with oil from the mud cake.

In still further accordance with the present invention, a method is provided for stabilizing a cement slurry, which method comprises the steps of providing a cement slurry; mixing the cement slurry with a surfactant blend comprising a first non-ionic surfactant having a hydrophilic-lipophilic balance of between about 10 and about 15, a second non-ionic surfactant having a hydrophilic-lipophilic balance of between about 2 and about 6, and an anionic surfactant; and positioning the cement slurry in a location exposed to oil-based fluid whereby the surfactant blend forms an emulsion with oil from the oil-based fluid.

BRIEF DESCRIPTION OF THE DRAWINGS

A detailed description of preferred embodiments of the present invention follows, with reference to the attached drawings, wherein.

DETAILED DESCRIPTION

Figure 1:
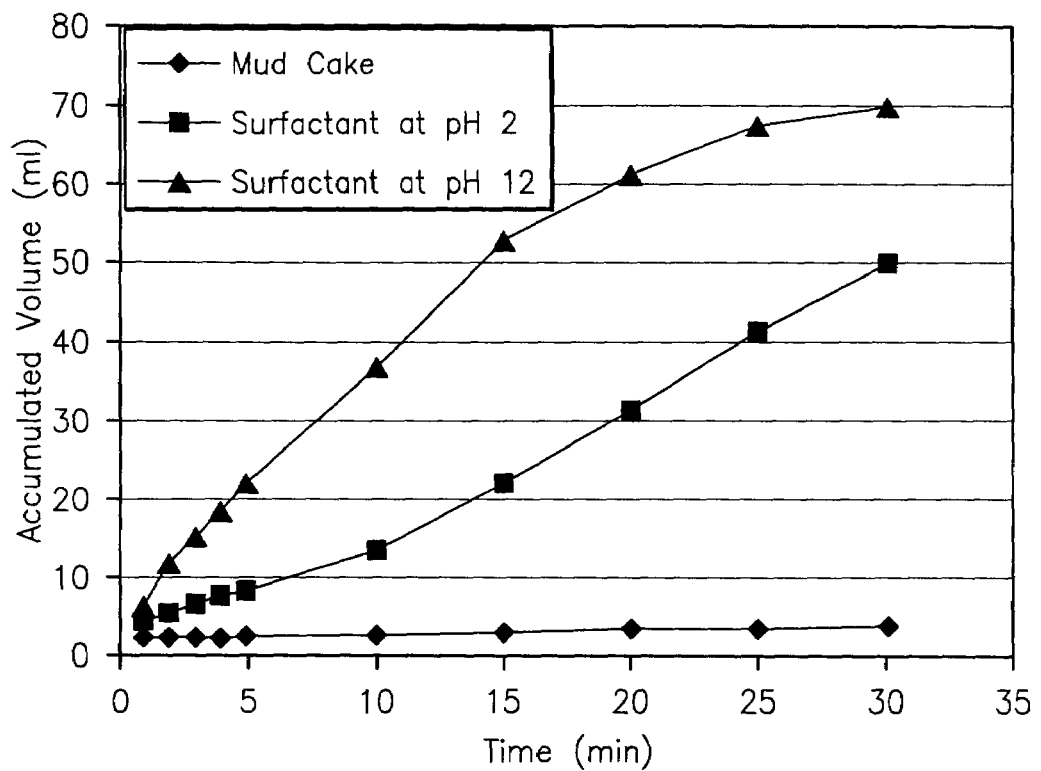
FIGS. 1 and 2 show accumulated volume and mass flow over time for a mud cake and a surfactant component in accordance with the present invention.

The invention relates to a surfactant blend which can advantageously be used as a well servicing fluid, particularly as a fluid for use in removal of a mud cake formed by an oil-based drilling fluid. The surfactant blend of the present invention can further advantageously be incorporated into cement slurries so as to increase resistance of these cement slurries to degradation due to contamination from oil-based fluids or materials.

In accordance with the present invention, the surfactant blend advantageously includes a first non-ionic component and a second non-ionic component, as well as an anionic component.

The first non-ionic component is advantageously a polyglycolic ether-type surfactant, preferably a synthesis alcohol and more preferably an ester modified synthesis alcohol having the formula $R-CH_2-O(CH_2CH_2O)_nH$, wherein n is the length of the chains in the alcohol. For the first non-ionic surfactant, it is preferred that this non-ionic surfactant have a hydrophilic-lipophilic balance, or HLB, of between about 10 and about 15. For the first non-ionic surfactant, n, or the length of chains, is advantageously between about 10 and about 20.

The second non-ionic surfactant is also preferably a polyglycolic ether type surfactant, more preferably an ester modified synthesis alcohol having a formula as set forth above. The second non-ionic surfactant advantageously has an HLB of between about 2 and about 6, and n, or the length of the chains of this composition, is advantageously between about 3 and about 10.

The anionic surfactant is advantageously an ammonium sulfate lauryl ether, preferably one having between about 3 and about 15 moles of ethylene oxide.

One particularly suitable modified synthesis alcohol for use in accordance with the present invention is ethoxylated tridecanol. Of course, other synthesis alcohols can be used as well.

The surfactant blend of the present invention can advantageously be dissolved into a base fluid such as water.

In use, and advantageously, the surfactant blend when exposed to an oil-based drilling fluid mud cake, serves to change the affinity of particulate matter disposed within the mud cake, for example such as solids present in the mud cake, including clay. This allows dispersion of the solids into the water. In addition, the surfactant blend forms an emulsion with oil from the mud cake, dispersing the oil as a dispersed phase through the water and allowing relatively easy removal of both solids and oil from the mud cake and formation wall as desired.

In accordance with the present invention, the first non-ionic surfactant, second non-ionic surfactant and anionic surfactant are advantageously provided in the following amounts The surfactant blend in accordance with the present invention preferably has concentrations of components wherein the first non-ionic surfactant is present in an amount between about 0.1 and about 12.0 vol. %, wherein the second non-ionic surfactant is present in an amount between about 0.1 and about 4.0 vol. % and wherein the anionic surfactant is present in an amount between about 0.1 and about 6.0 vol. %.

In further accordance with the invention, the first non-ionic surfactant and second non-ionic surfactant are advantageously provided at a ratio by volume of first surfactant to second surfactant of at least about 2:1 preferably at least about 3:1.

In accordance with the present invention, it has also been found that the surfactant blend can advantageously be used to protect cement slurries from degradation due to exposure to organic components such as oil-based drilling fluids and mud cakes. Thus, in accordance with the present invention, a surfactant blend as described above can advantageously be mixed with a typical cement slurry and the cement slurry can then be positioned in a location where it will be exposed to such organic components. In accordance with the present invention, and advantageously, the surfactant blend serves to change the wettability of any solids in this situation as well, and also serves advantageously to emulsify the organic or oil-based components so that these components are captured and do not adversely affect the structure or behavior of the cement slurry either in slurry form, during gelling, or after solidification.

As set forth above, one particularly troublesome problem in the prior art is the need to use oil-based solvent or washing fluid to remove the mud cake, after which a spacer or water-based fluid must be flushed through the zone before exposing the zone to the cement slurry. One particular advantage of the present invention is that the surfactant blend, when incorporated into a cement slurry, can advantageously dispose of oil-based fluid mud cakes and fluids, through offering of wettability of solid particles and formation of an emulsion with the oil, in a single step which includes positioning of the cement slurry in a location as desired.

In further accordance with the present invention, it has been found that the surfactant blend in accordance with the present invention performs even more advantageously when a salt additive such as sodium chloride is incorporated into the blend. The sodium chloride can advantageously be incorporated in an amount of between about 1 and about 25 vol. %, and this serves to greatly speed the mud cake removal when the surfactant blend is exposed to same.

It has also been found that exposing the formation to an acid wash such as hydrochloric acid can greatly speed removal of the mud cake from the formation, if desired. This is particularly true when the mud cake includes additives such as hematite and the like which may be left behind when the rest of the mud cake is removed.

As set forth above, the surfactant blend of the present invention contains three basic components. It has been found in accordance with the present invention that these components can advantageously be mixed in a preferable order. To this end it is preferred that a starting solution of the base liquid, preferably water, be provided. The first or high HLB non-ionic surfactant component is then mixed with the base fluid to form a first mixture. Following this mixture, the anionic surfactant is mixed with the first mixture so as to provide a second mixture. The second non-ionic surfactant, which is the low HLB component, is then advantageously mixed with the second mixture to provide the final surfactant blend. This sequence of mixing has been found to be important. If the non-ionic surfactants are mixed in reverse order, problems are experienced in connection with dissolving the low HLB non-ionic surfactant. These problems are alleviated by mixing in the preferred order as described above.

In further accordance with the invention, and as set forth above, it is a particular advantage of the present invention to utilize the surfactant blend of the present invention to both remove mud cakes and to protect cement slurries during positioning of same within a well.

In connection with removal of the mud cake, it is believed that the surfactant blend of the present invention advantageously serves to alter the wettability of particulate matter contained within the mud cake, whereby this particulate matter is dispersed throughout the surfactant blends. At the same time, the components of the surfactant blend also advantageously form an emulsion with oil from the mud cake, whereby the oil is removed from the well as a dispersed phase in a surfactant blend.

Still further according to the invention, the surfactant blend can advantageously be used to protect a cement slurry by mixing with same, and this advantageously allows for a mudcake removal and cement slurry positioning step to be carried out at the same time.

Based upon the foregoing, it should be clear that surfactant blend and various methods for making and using same have been provided which readily resolve the problems set forth to be solved by the object of the present invention.

The following examples further highlight the advantageous features of the present invention.

EXAMPLE 1

In this example, a surfactant component having a high HLB value was used to remove a mud cake formed with gasoil from a test formation. The system was an INTOIL® system formulated with 100% gasoil. The non-ionic surfactant component was tridecanol having an HLB of 15. This surfactant was tested at a pH of 2 and a pH of 12, at a temperature of 248° F., 500 psi and 300 rpm for 30 minutes. This testing was carried out in a mud cake evaluation cell.

Figure 2:
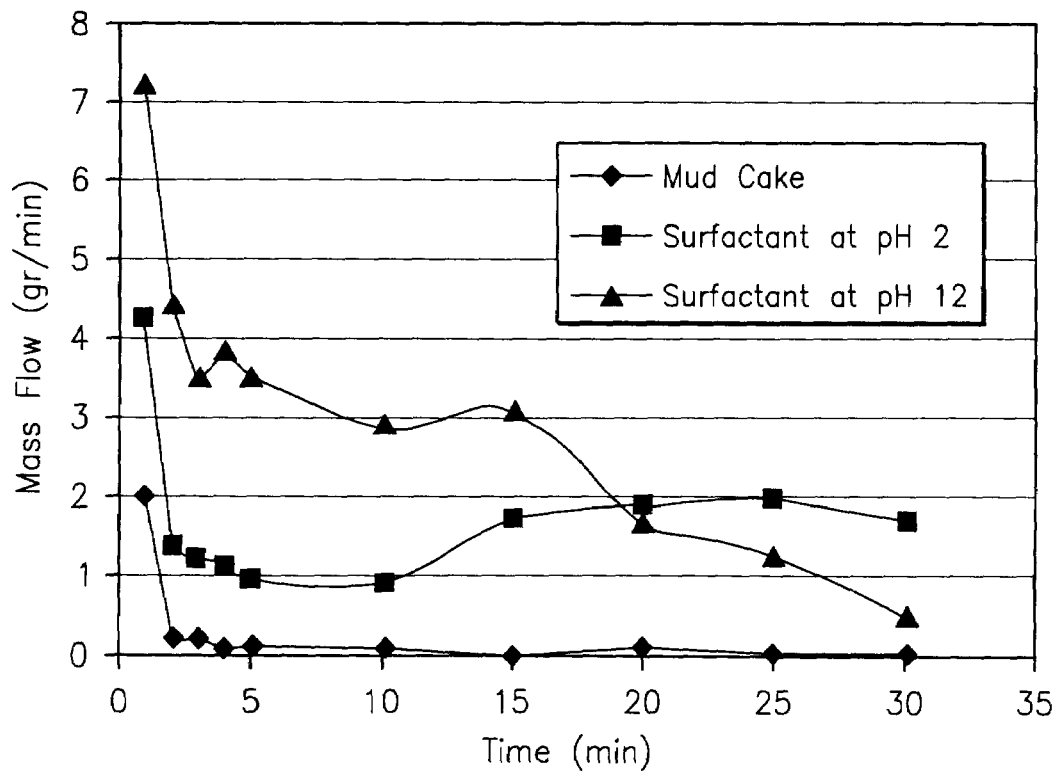

The testing shows that while the mud cake itself provides a negligible amount of accumulated volume and mass flow over time, the high HLB surfactant component of the present invention at low and high pH is very effective at removal of the mud cake, or lifting of the mud cake, as shown by the increasing accumulated volume levels of FIG. 1 and the mass flow of FIG. 2.

EXAMPLE 2

Figure 3:
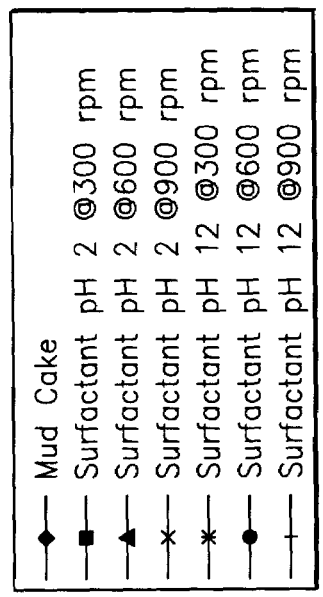
FIG. 3 shows accumulated volume over time for a surfactant component exposed to both gasoil and mineral oil.
Figure 3:
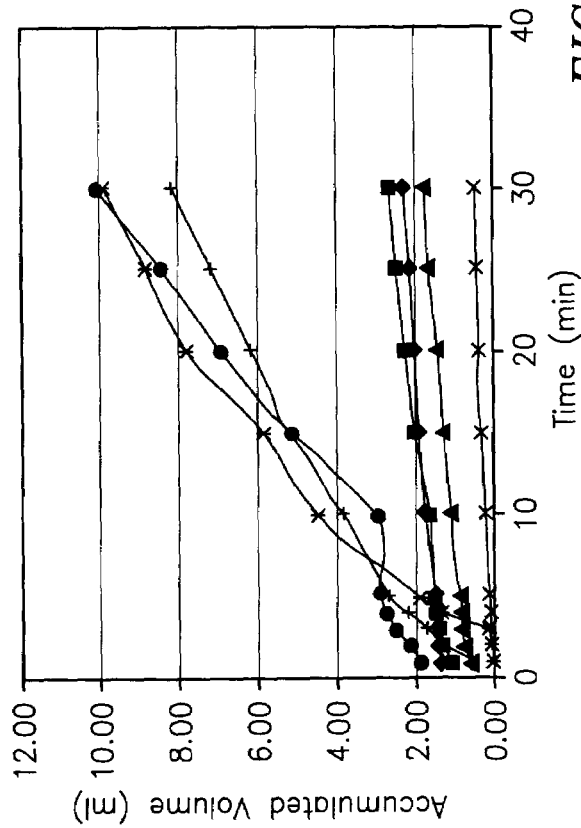

In this example, a similar system was studied, that is, an ethoxylated tridecanol system, 10%, at a pH of 2 and 12. These systems were tested using both mud cake formed from mineral oil and mud cake from gasoil. FIG. 3 shows the results in terms of accumulated volume over time, and the values obtained with the mineral oil are not nearly as good as those obtained with the gasoil. Thus, a quite different result is experienced between gasoil and mineral oil.

EXAMPLE 3

Figure 5:
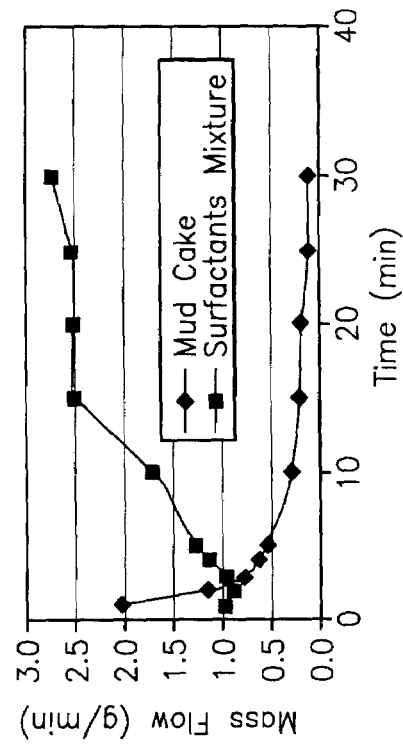
FIGS. 4 and 5 show accumulated volume and mass flow over time for a mud cake and a surfactant blend in accordance with the present invention.
Figure 4:
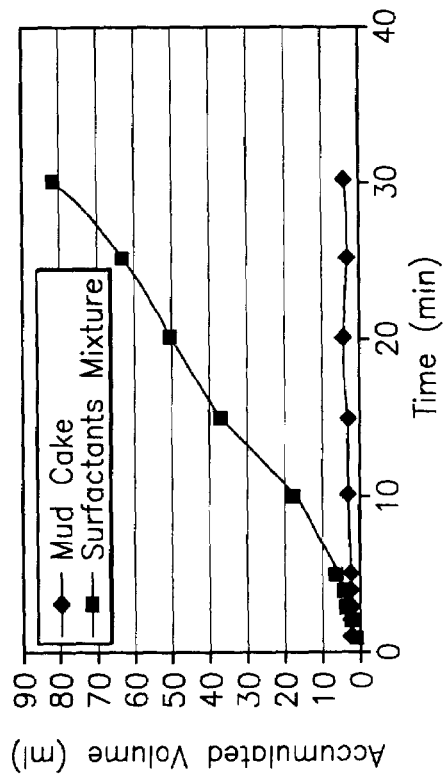

Taking the results of Examples 1 and 2 into consideration, a synergistic effect was detected with the different surfactants in a surfactant blend. A surfactant blend in accordance with the present invention and having composition as listed in Table 1 below was used on the same mineral oil mud cake, and FIGS. 4 and 5 show the results in terms of accumulated volume and mass flow in connection with same. These figures, measured at a pH of 12 and 248° F., 500 psi and 300 rpm for about 30 minutes, show quite efficient and effective lifting of the mud cake in accordance with the present invention.

EXAMPLE 4

In this example, three different wash formulations were prepared, each of which is described in Tables 1-3 below.

TABLE 1

Formulation 1

| Order | Additive | Concentration (% v/v) | Description |
|---|---|---|---|
| 1 | Water | 93.97 | Drinking water |
| 2 | TDC EO.15 | 2.9 | Non-ionic, HLB high |
| 3 | LSA EO.3 | 2.5 | Anionic |
| 4 | TDC EO.6 | 0.63 | Non-ionic, HLB low |

TABLE 2

Chemical wash (formulation 2)

| Order | Additive | Concentration (% v/v) | Description |
|---|---|---|---|
| 1 |  | 50 | — |
| 2 | Kerosene | 45 | — |
| 3 | Mineral oil | 5 | — |

TABLE 3

Chemical wash (formulation 3)

| Order | Additive | Concentration (% v/v) | Description |
|---|---|---|---|
| 1 |  | 30 | — |
| 2 | Kerosene | 60 | — |
| 3 | Xylene | 9 | — |
| 4 | Surfactant | 1 | Non-ionic, HLB low |

The formulation of Table 1 is a surfactant blend in accordance with the present invention containing the surfactant components set forth in Table 1, and formed by mixing in the sequence shown in the table.

Tables 2 and 3 show conventional or field washes, one of which is formed from gasoil, kerosene and mineral oil, and the other of which is formed from gasoil, kerosene, xylene and surfactant.

Each of these formulations was then used to remove an oil-based mud cake from a test vessel. Measurements were taken of the chemical removal percentage with respect to polymer concentration present in the drilling fluid, Table 4 sets forth the results which were obtained with a cut rate of 600 rpm on a BACP drilling fluid mud cake which was densified with hematite. Conditions were a temperature of 185° F. and pressure of 250 psi.

TABLE 4

| | Polymer Concentration (lb/bbl) | | | | | |
|---|---|---|---|---|---|---|
| | 3 | | 5 | | 7 | |
| Chemical wash | Mud cake mass (gr) | Chemical Removal (%) | Mud cake Mass (gr) | Chemical Removal(gr) | Mud cake Mass (gr) | Chemical Removal(%) |
| None | 7.30 | — | 6.39 | — | 5.80 | — |
| 1 | 7.03 | 3.70 | 5.58 | 12.68 | 4.33 | 25.34 |
| 2 | 7.29 | 0.14 | 5.89 | 7.82 | 5.03 | 13.28 |
| 3 | 7.19 | 1.51 | 5.69 | 10.95 | 4.8 | 17.24 |

As shown in Table 4, formulation 1 in accordance with the present invention showed better results for all different polymer concentrations tested as compared to the commercial washes tested.

EXAMPLE 5

Additional formulations, specifically formulations 4, 5, 6 and 7, were prepared in accordance with the present invention, some including as a further ingredient a densifying agent in the form of sodium chloride. Tables 5-8 show these formulations.

TABLE 5

Formulation 4

| Order | Additive | Concentration (% v/v) | Description |
|---|---|---|---|
| 1 | Water | 96.985 | Drinking water |
| 2 | TDC EO.15 | 1.45 | Non-ionic, HLB high |
| 3 | LSA EO.3 | 1.25 | Anionic |
| 4 | TDC EO.6 | 0.315 | Non-ionic, HLB low |

TABLE 6

Formulation 5

| Order | Additive | Concentration (% v/v) | Description |
|---|---|---|---|
| 1 | Water | 86.985 | Drinking water |
| 2 | TDC EO.15 | 1.45 | Non-ionic, HLB high |
| 3 | LSA EO.3 | 1.25 | Anionic |
| 4 | TDC EO.6 | 0.315 | Non-ionic, HLB low |
| 5 | NaCl | 10 | — |

TABLE 7

Formulation 6

| Order | Additive | Concentration (% v/v) | Description |
|---|---|---|---|
| 1 | Water | 83.97 | Drinking water |
| 2 | TDC EO.15 | 2.9 | Non-ionic, HLB high |
| 3 | LSA EO.3 | 2.5 | Anionic |

TABLE 7-continued

Formulation 6

| Order | Additive | Concentration (% v/v) | Description |
|---|---|---|---|
| 4 | TDC EO.6 | 0.63 | Non-ionic, HLB low |
| 5 | NaCl | 10 | — |

TABLE 8

Formulation 7

| Order | Additive | Concentration (% v/v) | Description |
|---|---|---|---|
| 1 | Water | 77.94 | Drinking water |
| 2 | TDC EO.15 | 5.8 | Non-ionic, HLB high |
| 3 | LSA EO.3 | 5 | Anionic |
| 4 | TDC EO.6 | 1.26 | Non-ionic, HLB low |
| 5 | NaCl | 10(p/v) | — |

Figure 6:
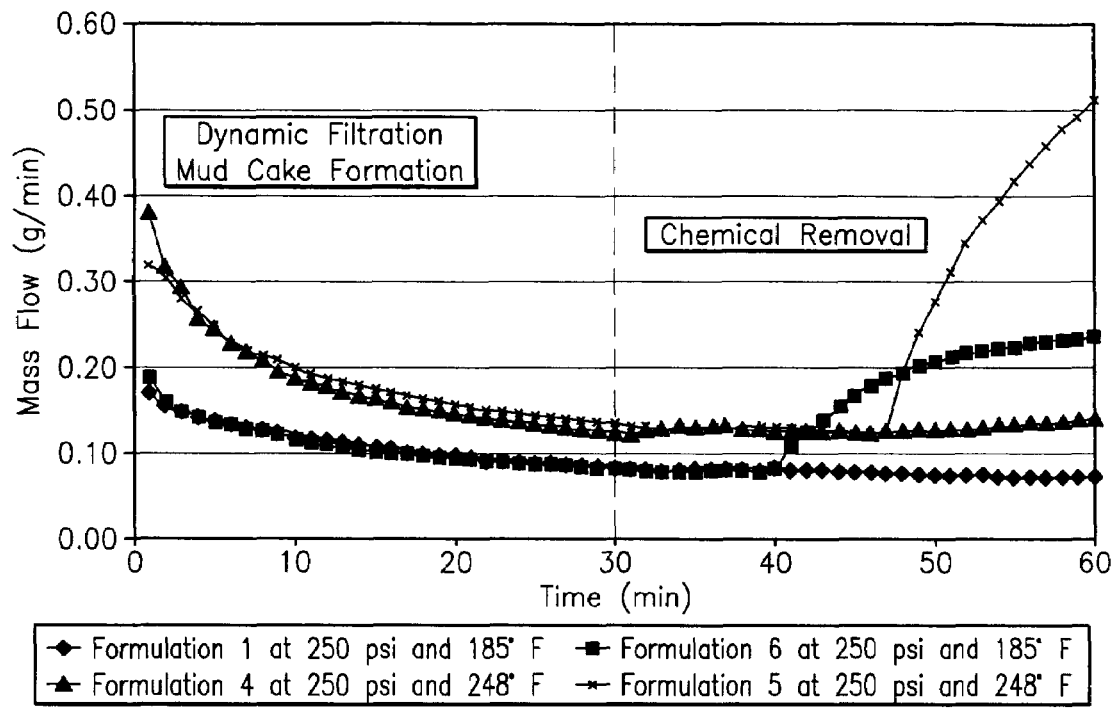
FIG. 6 shows mass flow over time for various formulations in accordance with the present invention at different temperatures.

The formulations of the above examples were then used to test filtrate mass flow during chemical removal of a fluid mud cake which had been densified with hematite and with 3 pounds per barrel lb/bbl of polymer. Formulations 4 and 5 were tested at 500 psi and 248° F., and formulations 1 and 6 were tested at 250 psi and 185° F. FIG. 6 shows the results of this testing, and shows that the addition of salt intensifies the cleaning or lifting of the mud cake at lower temperatures, and further that increasing the pressure and temperature allows removal of the mud cake at a lower surfactant concentration.

Figure 7:
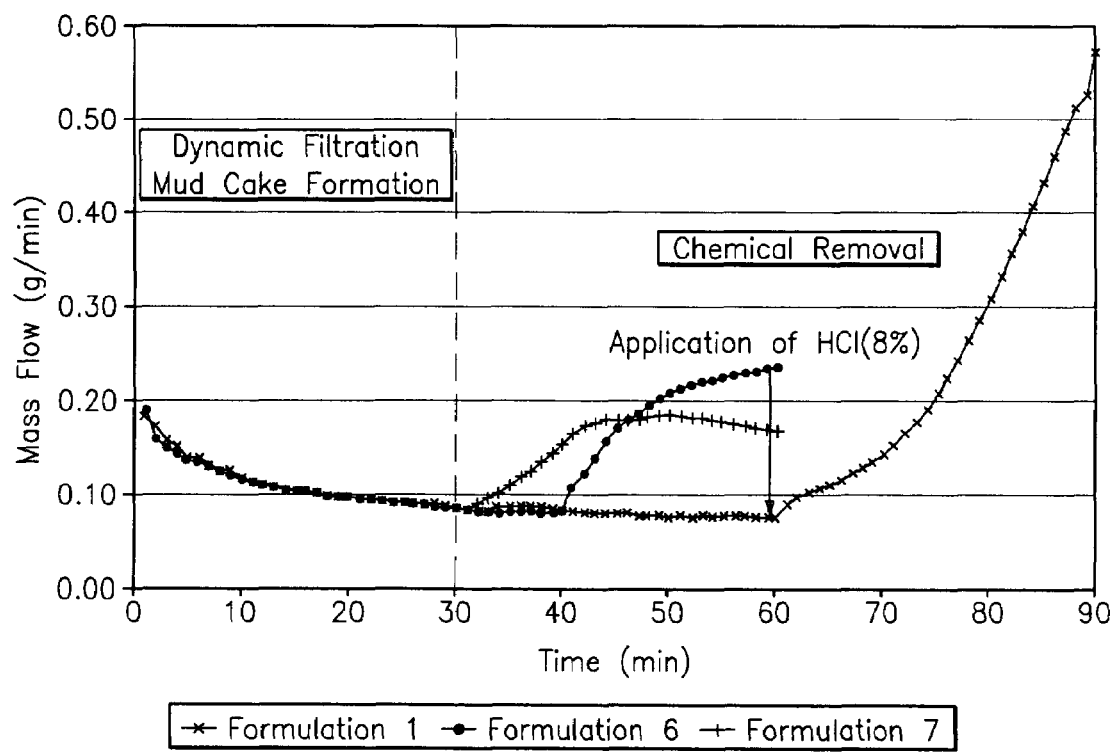
FIG. 7 shows mass flow over time for different formulations in accordance with the present invention and including application of hydrochloric acid.

FIG. 7 shows mass flow over time for formulations 1, 6 and 7, and further shows increase of the mass flow upon application of a solution of hydrochloric acid, in this case an 8 vol. % HCl acid solution. This solution was applied after use of the surfactant blend of the present invention. A marked increase in mass flow after application of the HCl is shown. This is believed to be due to dissolution of hematite by the HCl solution, at the same time as increasing the water wettability of the oil-based mud cake. This is particularly advantageous in accordance with the present invention.

EXAMPLE 6

Rheological properties of a cement slurry contaminated with a 20% oil-based mud were measured. Table 9 shows these properties.

TABLE 9

Evaluation results of Tensoactive Slurry

| Slurry Formulation | Density (ppg) | Jell time (H:Min) | Filtrate loss (ml/30 min) | Compression Resistance 24 Hr (psi) | Comments |
|---|---|---|---|---|---|
| H + 0.2 FL-54 + 0.02 gps FP-6L + 8% gel + 0.05 gps R-21L + 35% S-8 | 13.1 | 4:00 | 375 | 300 | Reference |
| CMT + 0.2 FL-54 + 0.02 gps FP-6L + 8% gel + 0.05 gps R-21L + 35% S-8 + 4.5 gps surfactants | 13.1 | 4:20 | 556 | 200 | Reference Formulation + Surfactants |
| CMT + 0.2 FL-54 + 0.02 gps FP-6L + 8% gel + 35% S-8 + 4.5 gps surfactants | 13.1 | 2:40 | 497 | 200 | Formulation Without Retarder |
| CMT + 0.2 FL-54 + 0.02 gps FP-6L + 8% gel + 0.06 gps R-21L + 35% S-8 + 4.5 gps surfactants | 13.1 | 5:20 | 367 | 240 | Formulation With Retarder |
| CMT + 0.2 FL-54 + 0.02 gps FP-6L + 8% gel + 0.05 gps R-21L + 35% S-8 + 4.5 gps surfactants + 20% oil mud | 12.7 | 6:30 | 367 | 240 | Formulation contaminated with 20% of oil-based mud |

In the above table, CMT is cement H; CD-33 is dispersing additive; FL-54 is a filtrate control additive; FP-6L is a filtrate control additive; R-21-L is a liquid retarder; and S-8 is an additive to prevent regression to the cement compression. As can be seen, the slurry containing the surfactant blend in accordance with the present invention maintains its properties even with mud contamination. In this particular example, the surfactant was only 243.2 ppm.

EXAMPLE 7

Figure 8A:
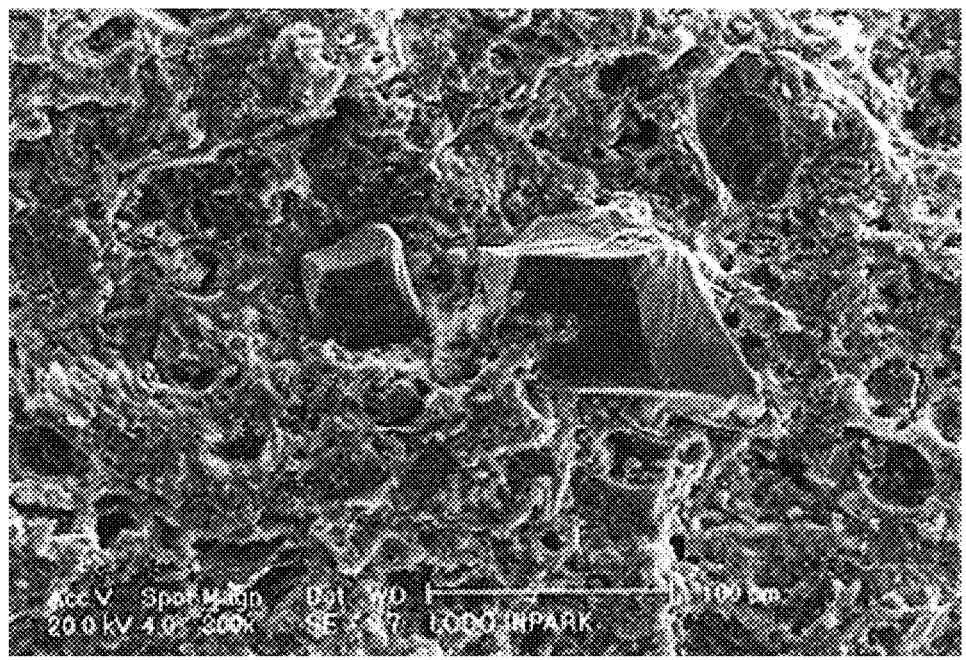
FIGS. 8 and 9 show electron microscope analysis of cement matrix formed after mixing with a surfactant blend of the present invention, and these figures show that the silicate phases and normal phases of cement hydration are displayed in the sample.
Figure 9A:
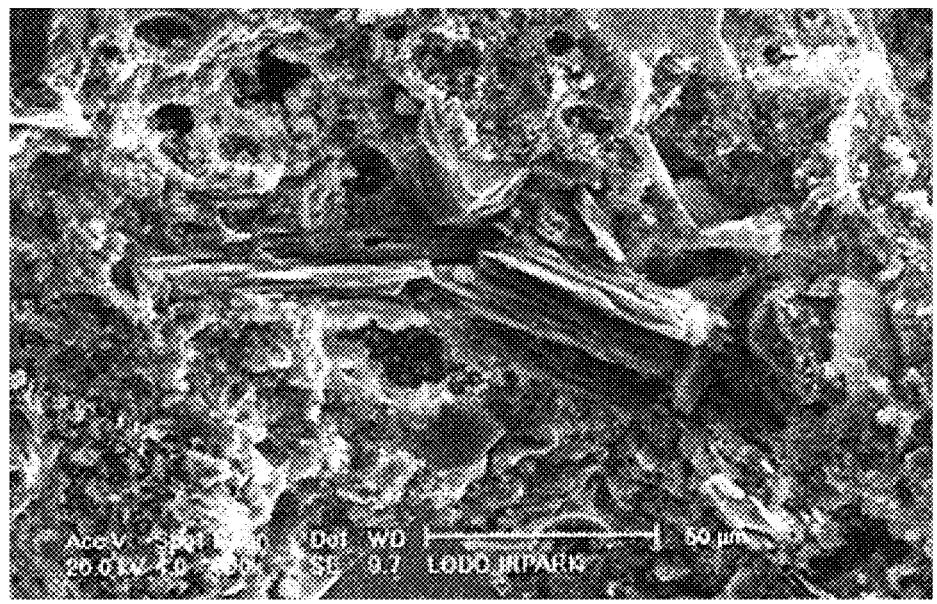
Figure 8B:
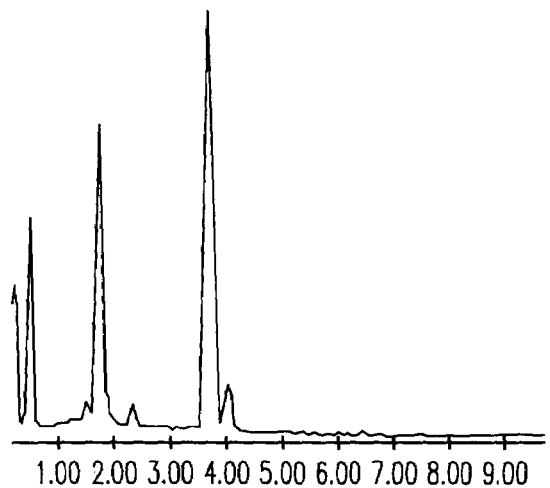
Figure 9B:
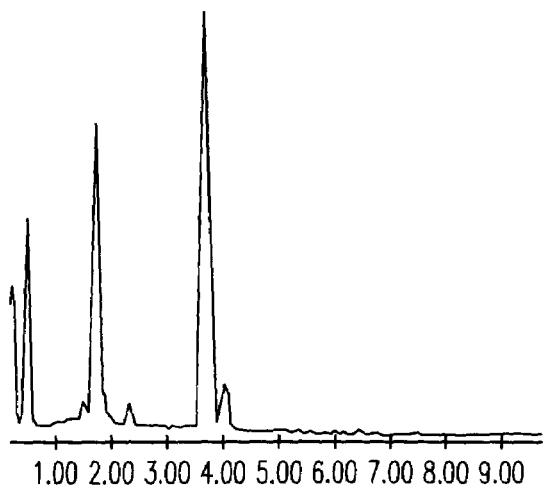

In this example, cement matrix was formed from a cement slurry treated in accordance with the present invention and exposed to oil contamination, electron microscopy testing was done. FIGS. 8 and 9 show this analysis in the form of electron microscopy. Each of these figures show that the cement matrix is not affected by the surfactant mixture. Specifically, silicate phases and normal phases of cement hydration are shown in these figures.

EXAMPLE 8

Figure 10:
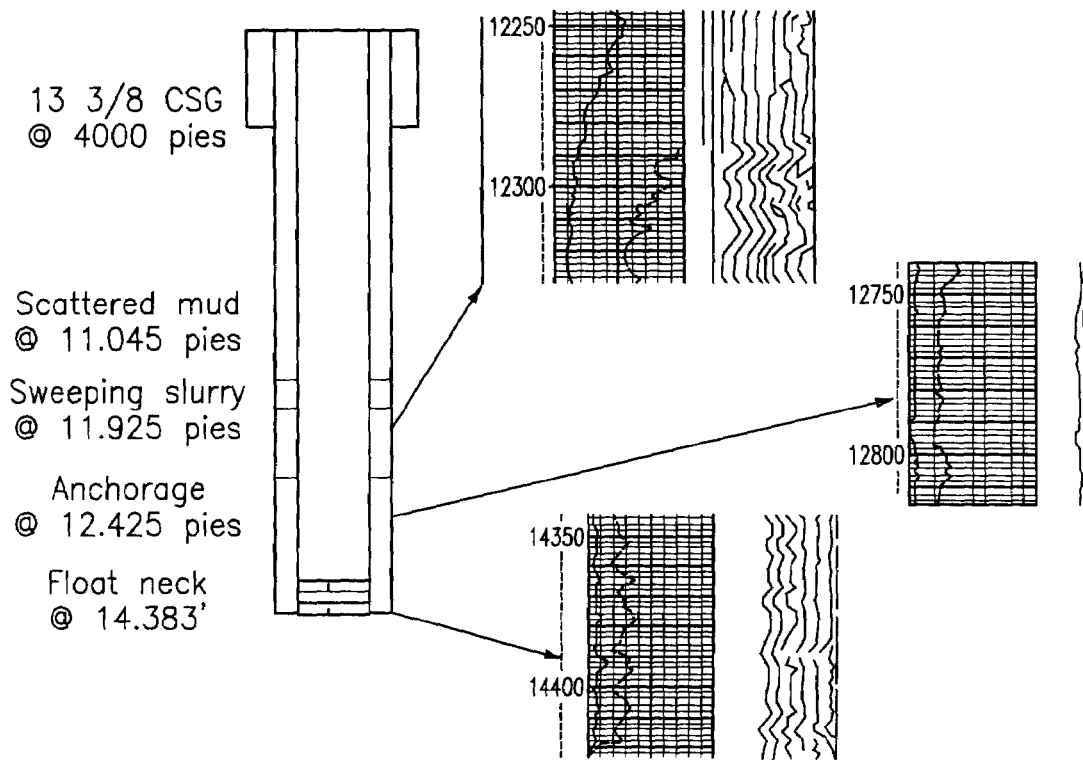
FIG. 10 shows an adherence record of a tensoactive slurry in accordance with the present invention used for removal of oil-based mud cake and, substantially simultaneous, well cementation.

A cement slurry in accordance with the present invention including a surfactant blend in accordance with the present invention was tested for adherence and other properties during gelling. FIG. 10 shows the testing conditions and log results, and it is clear that the cement slurry shows good adherence even after use of the slurry itself to remove oil-based mud cake with subsequent well cementation. This is particularly advantageous in accordance with the present invention.

EXAMPLE 9

In this example, various oil-based cement slurries were prepared. Table 10 shows results obtained using a commercial mud (active mud from Baker Hugues, density of 16.5 lpg.) while Table 11 shows results obtained using INTOIL® fluid 100% oil prepared in a laboratory.

TABLE 10

| Compression resistance at 24 hr. 100° F. (32° C.) (PSI) | Thickening time 113° F. (° C.) 3000 PSI (H:MIN) | Relation dilution mud oil/water | Density (lpg) | Slurry Formulation |
|---|---|---|---|---|
| 1100 | 8:20 | 10/90 | 14.2 | [REF] + 436 g water with surfactants + 44 g oil base mud |
| 850 | 7:17 | 20/80 | 14.8 | [REF] + 399 g water with surfactants + 80 g oil base mud |

TABLE 10-continued

| Compression resistance at 24 hr. 100° F. (32° C.) (PSI) | Thickening time 113° F. (° C.) 3000 PSI (H:MIN) | Relation dilution mud oil/water | Density (lpg) | Slurry Formulation |
|---|---|---|---|---|
| 1300 | 5:10 | 40/60 | 15.2 | [REF] + 345 g water with surfactants + 138 g oil base mud |
| 1400 | 2:54 | 48/52 | 15.4 | [REF] + 320 g water with surfactants + 155 g oil base mud |

In Table 10, [REF] means a reference composition having 684 g cement, 2 g C-252, and 2 g resin.

TABLE 11

| Compression resistance at 24 Hrs. 100° F. (32° C.) (PSI) | Thickening Time 113° F. (° C.) 3000 PSI (H:MIN) | Relation Dilution O/W | Density (lpg) | Formulation |
|---|---|---|---|---|
| 900 | >8:00 | 10/90 | 13.8 | 44 g mud 100% oil + 436 g surfactants + water + 684 CMT B + 2 g C252 + 0.44 GR-6 + 0.25 g Spersenne |
| 750 | 8:20 | 20/80 | 13.9 | 80 g mud 100% oil + 399 g surfactants + water + 684 g CMT B + 2 g C252 + 0.44 g R-6 + 0.25 g Spersenne |
| 500 | 7:10 | 40/60 | 14.1 | 138 g mud 100% oil + 436 g surfactants + water + 684 g CMT B + 2 g C-252 |
| 800 | 3:00 | 50/50 | 14.8 | 155 g mud 100% oil + 305 g surfactants + water + 684 g CMTB + 2 g C-252 + 0.44 g R-6 + 0.25 g Spersenne |

As can be seen, in both cases, the resulting system has excellent rheological properties, setting time and compression-resistance, even with mixtures up to 50/50 cement-mud. In these examples, the surfactant concentration was 243.0 ppm.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

The invention claimed is:

1. A surfactant blend for servicing wells, comprising:
a first non-ionic surfactant having a hydrophilic-lipophilic balance of between about 10 and about 15;
a second non-ionic surfactant having a hydrophilic-lipophilic balance of between about 2 and about 6; and
an anionic surfactant, wherein the anionic surfactant comprises an ammonium sulfate lauryl ether having between about 3 and about 15 moles of ethylene oxide.

2. The surfactant blend of claim 1, wherein the first and second non-ionic surfactants comprise polyglycolic ethers.

3. The surfactant blend of claim 2, wherein the polyglycolic ethers comprise modified synthesis alcohols having the formula:

$$R-CH_2-O(CH_2CH_2O)_nH,$$

wherein n is length of chains of oxide moles, and is between about 10 and 20 for the first non-ionic surfactant and between about 3 and about 10 for the second non-ionic surfactant.

4. The surfactant blend of claim 1, wherein the first non-ionic surfactant and the second non-ionic surfactant are present at a ratio by volume of first non-ionic surfactant to second non-ionic surfactant of at least about 2.

5. The surfactant of claim 4, wherein the ratio is at least about 3.

6. The surfactant blend of claim 1, further comprising a salt.

7. The surfactant blend of claim 1, wherein the blend is a component of a cement slurry.

8. A surfactant blend for servicing wells, comprising:
a first non-ionic surfactant having a hydrophilic-lipophilic balance of between about 10 and about 15;
a second non-ionic surfactant having a hydrophilic-lipophilic balance of between about 2 and about 6; and
an anionic surfactant, wherein the first and second non-ionic surfactant comprise ethoxylated tridecanol.

9. The surfactant blend of claim 8, wherein the anionic surfactant comprises an ammonium sulfate lauryl ether having between about 3 and about 15 moles of ethylene oxide.

10. A surfactant blend for servicing wells, comprising:
a first non-ionic surfactant having a hydrophilic-lipophilic balance of between about 10 and about 15;
a second non-ionic surfactant having a hydrophilic-lipophilic balance of between about 2 and about 6; and
an anionic surfactant, wherein the blend has concentrations of components as follows: first non-ionic surfactant between about 0.1 and about 12.0 vol. %, second non-ionic surfactant between about 0.1 and about 4.0 vol. %, and anionic surfactant between about 0.1 and about 6.0 vol. %.

11. A method for making a surfactant blend for servicing wells, comprising the steps of:
providing a base fluid;
mixing a first non-ionic surfactant having an HLB of between about 10 and about 15 into the base fluid to provide a first mixture;
mixing an anionic surfactant into the first mixture to provide a second mixture; and
mixing a second non-ionic surfactant having an HLB of between about 2 and about 6 into the second mixture to form the surfactant blend, wherein the blend has concentrations of components as follows: first non-ionic surfactant between about 0.1 and about 12.0 vol. %, second non-ionic surfactant between about 0.1 and about 4.0 vol. %, and anionic surfactant between about 0.1 and about 6.0 vol. %.

12. The method of claim 11, wherein the first non-ionic surfactant and the second non-ionic surfactant are present at a ratio by volume of first non-ionic surfactant to second non-ionic surfactant of at least about 2.

13. A method of claim 12, wherein the ratio is at least 3.

* * * * *

UNITED STATES PATENT AND TRADEMARK OFFICE
CERTIFICATE OF CORRECTION

PATENT NO. : 7,429,620 B2
APPLICATION NO. : 10/916045
DATED : September 30, 2008
INVENTOR(S) : Manuel Mas et al.

It is certified that error appears in the above-identified patent and that said Letters Patent is hereby corrected as shown below:

On the cover page, item [75] inventor address, "Eds Miranda" should read
-- Edo. Miranda --

On the cover page, item [75] inventor address, "Pto LaCroz" should read
-- Pto La Cruz --

On the cover page, item "(73) Assignee: Inteveo, S.A. (VE)" should read
-- (73) Assignee: Intevep, S.A. (VE) --

In column 4, line 6, there should be a period (.) at the end of the sentence

In column 5, line 40, "F.," should read -- F, --

In column 6, line 10, "F.," should read -- F, --

In column 6, line 66, "F." should read -- F --

In column 7, Table 7, "(%v(v)" should read -- (%v/v) --

In column 8, line 42, "F.," should read -- F, --

In column 10, Table 10, "100° F." should read -- 100° F --

In column 10, Table 10, "113° F." should read -- 113° F --

In column 10, Table 10, "(32° C.)" should read -- (32° C) --

In column 11, Table 11, "100° F. (32° C.)" should read -- 100° F (32° C) --

In column 11, Table 11, "113° F. (° C.)" should read -- 113° F (° C) --

UNITED STATES PATENT AND TRADEMARK OFFICE
CERTIFICATE OF CORRECTION

| | |
|---|---|
| PATENT NO. | : 7,429,620 B2 |
| APPLICATION NO. | : 10/916045 |
| DATED | : September 30, 2008 |
| INVENTOR(S) | : Manuel Mas et al. |

It is certified that error appears in the above-identified patent and that said Letters Patent is hereby corrected as shown below:

In column 14, line 21, "A" should read -- The --

Signed and Sealed this

Fifth Day of May, 2009

JOHN DOLL
*Acting Director of the United States Patent and Trademark Office*